June 17, 1958     V. RONKA     2,839,751
TRANSMITTING APPARATUS FOR INDUCTIVE PROSPECTING
Filed Sept. 13, 1954

INVENTOR
VAINO RONKA
BY: *Maybee & Legris*
ATT'YS

United States Patent Office 2,839,751
Patented June 17, 1958

2,839,751

TRANSMITTING APPARATUS FOR INDUCTIVE PROSPECTING

Vaino Ronka, Helsinki, Finland, assignor to Canadian Airborne Geophysics Limited, Toronto, Ontario, Canada, a Canadian company Application September 13, 1954, Serial No. 455,553

5 Claims. (Cl. 343—207)

This invention relates to prospecting by the electromagnetic method, in which a primary alternating electromagnetic field is set up by means of a transmitter, causing a secondary alternating electromagnetic field to be set up by eddy currents in nearby conductive geological formations, the resulting total field causing signals to be induced in a receiver whereby information about the geological formations can be obtained.

The transmitter and receiver utilize inductive means (inductors) such as coils or antennas to transmit and receive the electromagnetic signals. For example in U. S. Patent 2,642,477, issued June 16, 1953, to M. Puranen and A. A. Kahma is described a method of eliminating errors caused by variations in the distance between transmitting and receiving coils, or caused by any other change in the relative positions of the coils. The patent teaches the use of an additional transmitting coil and an additional receiving coil for transmitting and receiving signals of different frequency than the signals sent out by the main transmitting coil. Some later developments in the art indicate also the desirability of using more than one markedly different frequency. The patent suggests the desirability of regarding the two transmitting coils as a single coil, since as far as possible the two coils should occupy substantially the same position. However the use of a single coil has heretofore presented difficulties that have not been overcome in a practical way.

Not only are the two transmitting coils large, presenting installation and aerodynamic problems, particularly in aircraft, and adding to the cost of the prospecting equipment, but also the mutual coupling of the two coils complicates the feeding and tuning of the coils to the wanted frequencies.

It is the object of this invention to make it feasible to transmit electromagnetic signals of two markedly different frequencies from a single transmitting inductor such as a coil or antenna.

The invention consists of the method of transmitting electromagnetic fields which comprises supplying to a single transmitting inductor a current at each of two markedly different frequencies, and causing the inductor to resonate electrically at both frequencies. The invention also includes apparatus for performing the method.

A suitable apparatus embodying the invention is shown schematically in the accompanying drawing in which.

Figure 1:
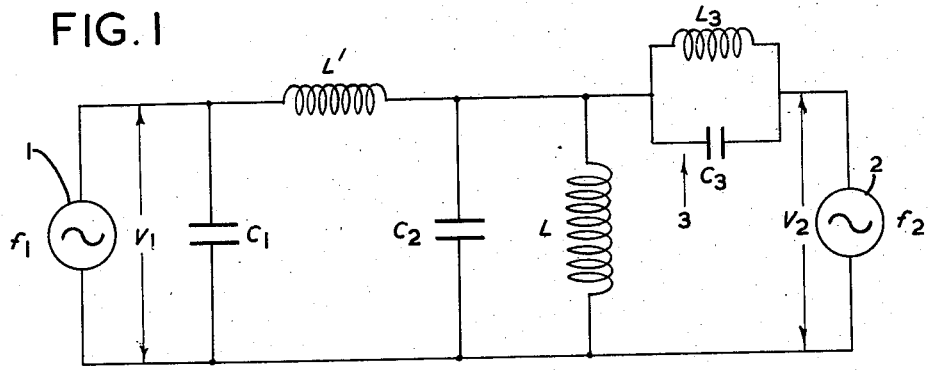
Fig. 1 is a schematic circuit diagram of a transmitting system embodying the invention.

Referring to Fig. 1, a first generator 1 generates a voltage $V_1$ of frequency $f_1$ and a second generator 2 generates a voltage $V_2$ of frequency $f_2$. By way of example, $f_1$ may be 400 cycles per second and $f_2$ may be 2000 cycles per second. A single inductor, in the form of a coil, for simultaneously radiating electromagnetic fields of frequencies $f_1$ and $f_2$, is designated L and is connected across generator 1 through an additional inductor $L'$. The coil L is connected across generator 2 through a filter 3 which, consisting of a capacitor $C_3$ in parallel with an inductor $L_3$, passes current at frequency $f_2$ from generator 2 but blocks current at frequency $f_1$ from generator 1. A capacitor $C_1$ is connected across the terminals of generator 1, and a capacitor $C_2$ is in parallel with coil L.

Capacitor $C_2$ is sufficiently small to have a high impedance at the low frequency $f_1$; capacitor $C_1$ is larger and has a low impedance at the high frequency $f_2$.

Figure 2:
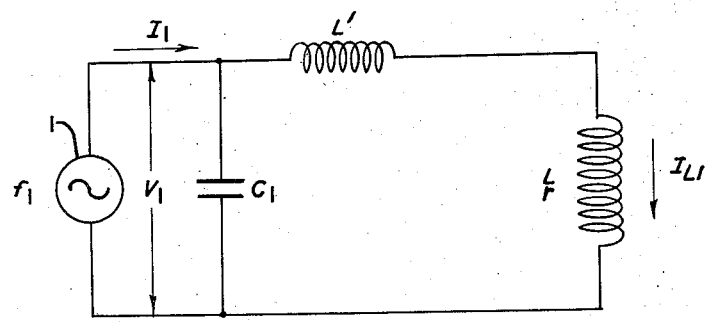
Fig. 2 is a schematic circuit diagram omitting the components of Fig. 1 which are of little effect at the lower of the transmitted frequencies.

For low frequency ($f_1$) purposes, due to the high impedance of $C_2$ and of filter 3, the circuit of Fig. 1 is substantially equivalent to the circuit of Fig. 2, where coil L and inductor $L'$ are in series with each other, forming a total inductance $L+L'$ in parallel with a capacitance $C_1$. With $C_1$ such that it resonates with $L+L'$ at frequency $f_1$, i. e. with $$2\pi f_1(L+L') = \frac{1}{2\pi f_1 C_1}$$

efficient radiation of electromagnetic signals at frequency $f_1$ from the coil L is effected.

Figure 3:
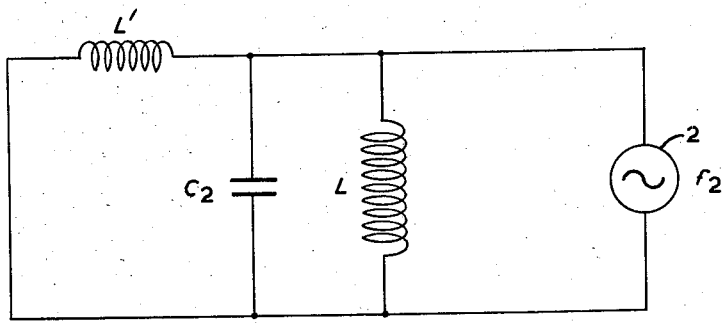
Fig. 3 is a schematic circuit diagram omitting the components of Fig. 1 which are of little effect at the higher of the transmitted frequencies.

For high frequency ($f_2$) purposes, due to the low impedance of $C_1$ and of filter 3, the circuit of Fig. 1 is substantially equivalent to the circuit of Fig. 3, where L, $L'$ and $C_2$ are in parallel across the generator 1. With $C_2$ such that it resonates with L and $L'$ at frequency $f_2$, i. e. with $$2\pi f_2\left(\frac{LL'}{L+L'}\right) = \frac{1}{2\pi f_2 C_2}$$

efficient radiation of electromagnetic signals at frequency $f_2$ from the coil L is effected.

It will thus be seen that the coil L is parallel tuned by the reactive means $L'$, $C_1$ and $C_2$ to resonate electrically at frequencies $f_1$ and $f_2$ simultaneously.

Typical values for the circuit components, where $f_1=400$ cycles per second and $f_2=2000$ cycles per second, are as follows:

$L=0.5$ millihenrys;  $C_1=158$ microfarads [1]
$L'=0.5$ millihenrys;  $C_2=25.3$ microfarads [1]
$L_3=10$ millihenrys;  $C_3=15.8$ microfarads

[1] These values are calculated from the foregoing equations. Since the equations are based on approximations, for ideal operation these calculated values need minor adjustments in practice due to the small effect of each capacitor in the tuned circuit of the other.

The generators 1 and 2 may operate at voltages $V_1=150$ volts and $V_2=115$ volts respectively.

To maintain a given field strength due to the coil L the volt-ampere capacity of each generator need be no larger than in the case where each is connected to a separate transmitting coil. Referring to Fig. 2, most of the losses are due to the large transmitting coil L. Thus, taking $r$ as the effective resistance of coil L, the resistance of the inductor $L'$ may be neglected, and the Q of the parallel resonant circuit of Fig. 2 is $$\frac{2\pi f_1(L+L')}{r}$$

At resonance, the current $I_{L1}$ through the coil L is roughly Q times the current $I_1$ supplied by the generator, i. e.

$$I_1 = \frac{r}{2\pi f_1(L+L')} \times I_{L1}$$

The voltage $V_1=I_{L1}2\pi f_1(L+L')$. Now suppose the inductor $L'$ is removed (the system thus being converted to one like that shown in U. S. Patent 2,642,477 where each generator drives its own transmitting coil). Capacitor $C_1$ will be adjusted to such a value that it is in parallel resonance with coil L at frequency $f_1$. The Q of the new parallel resonant circuit will be $$\frac{2\pi f_1 L}{r}$$

To maintain the same field strength, i. e. to maintain $I_{L1}$ at its former value, the generator voltage necessary will be only $V_1' = I_{L1} 2\pi f_{1L}$, so that $$\frac{V_1'}{V_1} = \frac{L}{L+L'}$$

The total current supplied by the generator 1 will be $$I_1' = \frac{r}{2\pi f_1 L} \times I_{L1}$$

so that $$\frac{I_1'}{I_1} = \frac{L+L'}{L}$$

Thus $V_1' I_1' = V_1 I_1$. It may similarly be shown that the volt-ampere capacity of generator 2 need be no larger than in the case where the generator 2 drives its own transmitting coil, i. e. than in the case where, in Fig. 3, inductor L' is disconnected and capacitor $C_2$ adjusted to be in parallel resonance with coil L at frequency $f_2$.

It is thought that the construction and use of apparatus embodying the invention will be apparent from the foregoing description. It is to be understood that the apparatus and method herein described with reference to the accompanying drawing are by way of example only. The method is applicable to the radio communications field, where markedly different frequencies may be radiated from one inductive radiator using the described method of tuning. Modifications incorporating the spirit of the invention are therefore quite possible, and the scope of the invention is defined, with varying breadth, by the following claims.

What I claim is:

1. In the art of electromagnetic prospecting, apparatus for transmitting from the same location two alternating electromagnetic fields of markedly different frequencies, comprising an electrical circuit including a single transmitting inductor, a capacitor in parallel therewith, another inductor, a larger capacitor in parallel with the transmitting inductor through said other inductor, means for simultaneously supplying electrical currents at said two different frequencies to said circuit, the larger capacitor at the higher frequency having low impedance whereby the transmitting inductor, said other inductor, and the smaller capacitor are effectively in parallel with one another at the higher frequency, the smaller capacitor and said other inductor resonating with the transmitting inductor at the higher frequency, and the smaller capacitor at the lower frequency having sufficiently high impedance to be of negligible effect, the larger capacitor and said other inductor resonating with the transmitting inductor at the lower frequency.

2. In the art of electromagnetic prospecting, apparatus for transmitting from the same location two alternating electromagnetic fields of markedly different frequencies, comprising a single transmitting inductor, a capacitor in parallel therewith, another inductor, a larger capacitor in parallel with the transmitting inductor through said other inductor, a source of alternating current at the lower of said frequencies connected across the larger capacitor, a source of alternating current at the higher of said frequencies connected through a filter across the transmitting inductor, the filter offering a high impedance to current of the lower frequency and a low impedance to current of the higher frequency, the larger capacitor being in resonance with the inductors at the lower frequency and the smaller capacitor being in resonance with the inductors at the higher frequency.

3. In the art of electromagnetic prospecting, apparatus as claimed in claim 2, in which the small capacitor has sufficiently high impedance at the lower frequency to be of negligible effect at the lower frequency.

4. In the art of electromagnetic prospecting, apparatus as claimed in claim 2, in which the larger capacitor has sufficient low impedance at the higher frequency to connect the two inductors effectively in parallel with each other and with the smaller capacitor at the higher frequency.

5. In the art of electromagnetic prospecting, apparatus as claimed in claim 4, in which the smaller capacitor has sufficiently high impedance at the lower frequency to be of negligible effect.

References Cited in the file of this patent

UNITED STATES PATENTS

| | | |
|---|---|---|
| 1,601,109 | Chaffee | Sept. 28, 1926 |
| 1,740,969 | Chireix | Dec. 24, 1929 |
| 1,802,738 | Roberts | Apr. 28, 1931 |
| 2,096,782 | Brown | Oct. 26, 1937 |